United States Patent [19]
Bright et al.

[11] Patent Number: 5,252,704
[45] Date of Patent: Oct. 12, 1993

[54] REDISPERSIBLE POLYMER POWDERS USING POLYVINYL PYRROLIDONE AS A DISPERSING AID

[75] Inventors: Randall P. Bright, Allentown; Jayson C. Vassallo, Northampton, both of Pa.

[73] Assignee: Air Products and Chemicals, Inc., Allentown, Pa.

[21] Appl. No.: 894,410

[22] Filed: Jun. 5, 1992

[51] Int. Cl.$^5$ ............................. C08F 6/00; C08J 3/00
[52] U.S. Cl. ................................... 528/501; 523/334; 525/205; 525/516
[58] Field of Search ................. 523/342; 525/205, 516; 528/501

[56] References Cited

U.S. PATENT DOCUMENTS

Re. 28,780 4/1976 Bergmeister et al. .

FOREIGN PATENT DOCUMENTS 2020449 1/1991 Canada .
0078449 11/1983 European Pat. Off. .
2238903 10/1976 Fed. Rep. of Germany .

*Primary Examiner*—Paul R. Michl
*Assistant Examiner*—LaVonda DeWitt
*Attorney, Agent, or Firm*—Michael Leach; James C. Simmons; William F. Marsh

[57] ABSTRACT

A method for preparing a polymer powder which is redispersible in water by atomizing an aqueous non-polyvinyl alcohol stabilized polymer dispersion containing a dispersing aid consisting of vinyl pyrrolidone homopolymer.

11 Claims, No Drawings

REDISPERSIBLE POLYMER POWDERS USING POLYVINYL PYRROLIDONE AS A DISPERSING AID

FIELD OF THE INVENTION

The present invention relates to the redispersion of polymer emulsions that have been sprayed dried into powders.

BACKGROUND OF THE INVENTION

Redispersible polymer powders are polymer emulsions which have been converted by spray drying (atomizing the aqueous polymer dispersions in a stream of hot air) to free flowing powders. When blended with water, these powders redisperse back into liquid emulsions with essentially identical properties to the original emulsions. With dispersions whose polymers have glass transition temperatures (Tg) below about 50° C., it is necessary to add dispersing aids to coat the individual spray dried particles to prevent them from sticking together and to promote redispersion of the particles into an emulsion. The sticking can occur in the spray drying apparatus when the powder is at elevated temperatures, or upon long term storage under the influences of heat, humidity and pressure.

The current technology in the area of dispersing aids involves mainly the use of polyvinyl alcohol (PVOH). PVOH works well in many redispersible powders that are commercially available. It appears to work as a dispersing aid only with polymer emulsions that utilize PVOH as a colloidal stabilizer, i.e., the emulsions themselves are produced using PVOH as the colloidal stabilizing system to produce a stable emulsion. The use of PVOH as the colloidal stabilizer generally produces an emulsion with a high degree of water sensitivity. This built in water sensitivity, along with the addition of PVOH, allows these emulsions to be redispersible and, consequently, spray dried.

However, there are many polymer emulsions that utilize other colloidal stabilizing systems. These other stabilizing systems include polyvinyl pyrrolidone (PVP), cellulosics, surfactants and combinations of these with and without PVOH. In general, polymer emulsions produced with stabilizing systems other than PVOH are not redispersible through the addition of PVOH as a dispersing aid.

There are advantages in using these other colloidal stabilizing systems. They generally produce polymer emulsions with better water resistance and a finer particle size than a PVOH stabilizing system. When a polymer emulsion with superior water resistance is used in a formulation, as for example, an adhesive or an additive into cement, the resulting final product will generally also have superior water resistance.

There are also other advantages to the cellulosic and surfactant stabilized systems. There are certain monomer systems that cannot be stabilized with PVOH alone. This severely limits the types of polymer emulsions that can be spray dried. It is in these areas that PVOH is deficient as a dispersing aid.

There are several disclosures regarding the use of vinyl pyrrolidone polymers as a dispersing aid in redispersible polymer powders:

DE 22 38 903 discloses drying a mixture of aqueous dispersions of copolymers using as dispersing aids a copolymer (A) of 20 to 80 wt% vinyl chloride and 80 to 20 wt% vinyl acetate and/or vinyl propionate, a copolymer (B) of 60 to 90 wt% styrene, 5 to 35 wt% of acrylonitrile, methacrylonitrile, methyl acrylate, ethyl acrylate, t-butyl acrylate, methyl methacrylate, vinyl acetate and/or vinyl propionate, 5 to 10 wt% of an $\alpha,\beta$-olefin-unsaturated carboxylic acid, and 0 to 5 wt% of acrylamide, methacrylamide and/or vinyl pyrrolidone, and if applicable also a vinyl pyrrolidone polymer (C), with a ratio of copolymer (A) to copolymer (B) to polymer (C) is 75 to 95:5 to 25:0 to 20. Example 2 shows the use of PVP in the spray drying a blend of copolymer emulsions, one of which was prepared using PVOH as part of a costabilizing system.

U.S. Pat. No. 28,780 discloses a process for the preparation of free-flowing, lump-free redispersible synthetic resin powders by spray drying aqueous dispersions of synthetic resins containing an added amount of a water soluble condensation from melamine and fomaldehyde and containing sulfonate groups. It is also disclosed at Col 3/45-53 that "[i]t may also be advantageous, optionally to add, to the dispersion before spray drying protective colloids, such as polyvinyl alcohol, cellulose derivatives and polyvinyl pyrrolidone, or inert substances, such as kaolin, chalk, silicates, talc, diatomaceous earth, silicic acid, barium or calcium sulfate, in amounts of from 5% to 50% by weight, based on the solids content of the synthetic resin powder. Thereby in some cases improvements in the storage ability are also attained." U.S. Re '780 does not suggest the use of PVP alone and none of the examples show the use of PVP.

EP 0 078 449A discloses a process for the production of water dispersible polymer powders by spraying the aqueous polymer dispersions containing an admixture of:

a) a water soluble copolymer consisting of 20 to 70 wt% vinyl pyrrolidone and 30 to 80 wt% vinyl acetate and/or b) a water soluble alkali- and/or alkali earth salt of a naphthalene sulfonic acid fomaldehyde condensate product.

This reference specifically discloses the use of the vinyl pyrrolidone/vinyl acetate copolymer for polymer emulsions down to a Tg of −60° C. It does not suggest the use of PVP homopolymer.

CA 2,020,449 discloses redispersible polymer powders obtainable by atomizing aqueous polymer dispersions to which from 3 to 50 wt%, based on the polymer, of a water soluble alkali metal salt or alkaline earth metal salt of a phenolsulfonic acid/fomaldehyde condensate has been added. This reference at page 4/31-36 states, "In addition to the condensates, water-insoluble finely divided solids, for example finely divided silica or water-soluble protective colloids, for example polyvinyl alcohols or vinyl pyrrolidone (co)polymers, may also have been added to the polymer dispersions in the preparation of the polymer powders." Again this reference does not suggest the use of PVP alone and none of the examples show the use of PVP.

SUMMARY OF THE INVENTION

The present invention provides a polymer powder which is redispersible in water and is obtained by spray drying, or atomizing, a non-PVOH stabilized aqueous polymer dispersion containing a specific dispersing aid. The dispersing aid utilized in the invention consists of vinyl pyrrolidone homopolymer (PVP).

The redispersible polymer powders obtained according to the new process are particularly suited as additives to cementious compositions, such as gypsum, cement, mortar and magnesia cement. Insofar as adhesive copolymer dispersions are used for their manufacture, the powders are also suited for production of adhesive coatings or as adhesive powders, which make it possible to glue together moistened surfaces by sprinkling one of the surfaces with the powder and pressing together.

DETAILED DESCRIPTION INVENTION

The polymer dispersions for the preparation of the redispersible polymer powders can be obtained in a conventional manner by aqueous emulsion polymerization of olefinically unsaturated monomers in the presence of the usual polymerization initiators and emulsifiers at elevated temperatures, for example up to about 95° C. The mean particle size can be adjusted by conventional measures, for example via the type and amount of the emulsifiers: for the preparation of coarse-particle polymer dispersions, a small amount of emulsifier and nonionic or highly ethoxylated ionic emulsifiers are generally advantageous. Protective colloids other than PVOH, for example PVP and cellulosics, frequently have an advantageous effect. Thus the emulsifying agents composing the stabilizing system which can be used in the polymerization recipe for making the non-PVOH containing polymer dispersions include ionic and nonionic surfactants, preferably the nonionic types which are well known to those skilled in the polymerization art. Suitable nonionic emulsifying agents include poly(ethyleneoxy) condensates. Other emulsifying agents include protective colloids, such as PVP and the cellulose materials such as methyl cellulose, hydroxyethyl cellulose, hydroxypropylmethyl cellulose and the like.

The concentration range of the total amount of the emulsifying agents useful is from 0.5 to 10%, preferably 1.5 to 5%, based on total emulsion.

Preferred polymer dispersions have a mean particle diameter (weight average) of from 100 to 5,000 nm, in particular from 650 to 5,000 nm. The measurement of the mean particle size of polymer dispersions, for example with the aid of an ultra centrifuge, is familiar to the skilled worker. The LT value i.e. the light transmittance of the aqueous dispersion diluted to 0.01% by weight, a standard parameter, can also be used as a measure of the mean particle size of a polymer dispersion of similar monomer composition.

In the preparation of the polymer powders, the polymer content of the dispersion may vary from 30 to 65 wt%, and particular from 45 to 60 wt%. The polymers generally have glass transition temperatures (Tg) of from +50° to −60° C., polymers having a Tg of less than +25° C. preferably being used.

Examples of olefinically unsaturated monomers from which the polymers may be derived are vinyl aromatic monomers, such as styrene, monoolefinically unsaturated carboxylates of, in general, 4 to 14 carbon atoms, in particular acrylates and methacrylates of alkanols of 1 to 8 carbon atoms, and vinyl esters, in particular of acetic and propionic acids, as well as vinyl laurate and vinyl esters of versatic acids. Other suitable polymers are those which are derived from vinyl chloride and/or vinylidine chloride or from ethylene and diolefins, in particular butadiene. In addition, the polymers may contain, as polymerized units, acrylonitrile and/or mono- and/or dicarboxcylic acids of, in general, 3 to 5 carbon atoms and/or their amides which may be substituted at the nitrogen atom, in particular acrylic acid, methacrylic acid, itaconic acid, acrylamide, methacrylamide, N-methylol (meth)acrylamide and N-ethoxymethyl (meth)acrylamide. The amount of such monomers can be varied within wide ranges. It is from 0 to 40 wt%, frequently from 10 to 30 wt%, in the case of acrylonitrile and frequently from 0.5 to 5 wt%, in particular from 1 to 4 wt%, in the case of monoolefinically unsaturated monomers having polar groups, such as acrylic acid or N-methylol methacrylamide. The polymers may also contain, as polymerized units small amounts of olefinically unsaturated esters of alkanediols such as ethylene glycol monoacrylate (2-hydroxyethyl acrylate) and diacrylate and the corresponding methacrylates and propane-1,2-diol and butane-1,4-diol monoacrylates and diacrylates and the corresponding methacrylates. Finally, polymer dispersions which contain, as polymerized units, ethylene and vinyl acetate in a molar ratio of, in general, from 15:85 to 85:15 are also suitable.

Other preferably used copolymers are those of acrylates and methacrylates of alkanols of 1 to 8 carbon atoms, which may contain, as polymerized units, not more than 65 wt% in particular from 15 to 60 wt%, styrene or a mixture of styrene and not more than 40 wt% based on the styrene/acrylonitrile mixture of acrylonitrile.

It is preferred to incorporate small amounts of functional monomers into the polymer to be spray dried because they facilitate the the efficacy of the PVP.

In the preparation of the polymer powders, PVP (vinyl pyrrolidone homopolymer) having a viscosity average molecular weight (Mv) ranging from 3,500 to 3,000,000 (K values of 12 to 120) are added to the polymer dispersions prior to spray drying, in an amount effective for redispersing the dried polymer powder in water, such as from 3 to 20, preferably 5 to 18 and in particular from 8 to 15 wt%, based on the polymer content of the aqueous polymer dispersions. PVP in the range of K-30 to K-90 is preferred. For low Tg polymers it is desirable to use the lowest K value PVP possible.

In addition to the vinyl pyrrolidone homopolymer, water-insoluble finely divided solids, for example finely divided silica may also be added to the polymer dispersions in the preparation of the polymer powders. However, PVP is the sole polymeric dispersing aid used.

Spray drying, or atomization, of the aqueous polymer dispersions which contain PVP can be carried out in a conventional manner well known in the art, in particular using one-material or multi-material nozzles or atomizer disks. The dispersions are generally atomized in a warm air stream, in which the water evaporates. Atomization can be carried out under atmospheric or reduced pressure. In general, the temperature of the warm air stream used for spray drying is from 100° to 2000° C., in particular from 120° to 1700° C. The dry redispersible polymer powders can be separated off in a conventional manner, in particular using cyclones or filtered evaporators.

Polymer powders having good blocking resistance are obtained in a high yield and can be readily stored at room temperature, without caking. The polymer powders are readily redispersible in water. After stirring in water, they can be cast into films which are similar in their tensile strength and elongation break to films obtained from the primary dispersions.

As modifiers for cementious mixtures, the polymer powders at 5 to 30 wt% are mixed with cement. Further processing by mixing with water and if necessary mineral additives gives mortars having good flow and high flexibility.

It has also been found advantageous in some systems to add an inert filler material such as clay, chalk, talc, silica or other fine sized particle, to reduce the tendency for the redispersible powder to block over long term storage. The useful range of this filler is from 0 to 40 wt%, based on the redispersible polymer powder, preferably from 8 to 30 wt%. The amount of filler material used depends on the particular polymer and its Tg.

The redispersibility of a particular polymer emulsion systems is related to the ability of this emulsion system to be spray dried. In the following examples this redispersibility was evaluated by drawing down a 0.003 inch (0.08 mm) thick film of the emulsion onto a glass plate. The plate was then placed in an oven at 160° F. (71° C.) for 30 minutes. After cooling, the film was evaluated for redispersibility by placing several drops of water on the film. After several seconds, the water is rubbed into the dried film. Polymer emulsions whose films immediately redisperse and cloud the water have been found to have excellent redispersibility after spray drying. Polymer emulsions whose films "blush" when water is added but do not redisperse have been found not to be redispersible after spray drying. This test is therefore an excellent screening tool to determine the suitability of a particular polymer emulsion for spray drying.

EXAMPLE 1

The polymer emulsion used in this example was an ethylene-vinyl chloride copolymer emulsion produced with a sodium lauryl sulfate stabilization system. The copolymer comprised 74.6 wt% vinyl chloride, 22.7 wt% ethylene and 2.7 wt% acrylamide and had a Tg of 14° C. The copolymer emulsion was blended with 12 wt% PVP (K-30) on a dry basis. Evaluation of a dried film of the resulting emulsion blend showed it to be redispersible. The emulsion mixture was spray dried to produce a free flowing redispersible powder with no buildup being produced on the side walls of the spray dryer. The polymer powder was found to be suitable as a modifier for cementitious compositions.

EXAMPLE 2

In this example an acrylic copolymer emulsion was used in which the copolymer comprised butyl acrylate, methyl methacrylate, methacrylic acid and N-methylacrylamide and had a Tg of 50° C. The acrylic copolymer emulsion was produced using a disodium ethoxylated dodecyl alcohol protective colloid stabilizing system. The acrylic copolymer emulsion was blended with 8 wt% PVP (K-30), on a dry basis, and was found to be redispersible as determined by evaluation of a dried film. The emulsion mixture was spray dried to produce a free flowing redispersible powder with no resulting buildup on the sidewalls of the spray dryer. The polymer powder was found to be suitable as a modifier for cementitious compositions.

EXAMPLE 3

In this example a vinyl acetate/ethylene/acrylic copolymer emulsion was used. The copolymer comprised 31 wt% vinyl acetate, 18 wt% ethylene, 44 wt% 2-ethylhexyl acrylate, 4 wt% 2-hydroxyethylacrylate, 2 wt% acrylic acid, 0.7 wt% acrylamide and 0.1 wt% sodium vinyl sulfonate at a −40° C. Tg and was produced using a combination of sodium alkylphenoxy ethoxy sulfate and the disodium salt of ricinoleic acid sulfosuccinate stabilizing system. The copolymer emulsion was blended with 15 wt% PVP (K-30), on a dry basis, and was found to be redispersible by evaluation of a dry film. This copolymer emulsion/PVP blend was spray dried to produce a free flowing powder with no resulting buildup on the sidewalls of the spray dryer. The polymer powder was found to be suitable as a modifier for cementitious compositions.

EXAMPLE 4

The copolymer emulsion used in this example contained a vinyl acetate/ethylene/acrylic acid copolymer having a Tg of 0° C. and prepared in the presence of a hydroxyethyl cellulose, ethylene oxide-propylene oxide block copolymer and nonylphenoxy poly(ethyleneoxy) ethanol stabilizing system. The VAE copolymer emulsion was blended with 12 wt% PVP, on a dry basis, and was found to be redispersible by evaluation of a dried film. The polymer powder was found to be suitable as a modifier for cementitious compositions. When the emulsion copolymer did not contain the functional comonomer acrylic acid, PVP was not suitable as a dispersing aid.

In the following comparative examples the PVOH used as the dispersing aid was 88 mole% hydrolyzed and had a DPn of about 500.

COMPARATIVE EXAMPLE 1

The copolymer emulsion of Example 1 was blended with 12 wt% PVOH and was found not to be redispersible by evaluation of a dried film.

COMPARATIVE EXAMPLE 2

The copolymer emulsion of Example 1 was blended with 10 wt%. poly(vinyl pyrrolidone/vinyl acetate) [poly(VP/VAc)] copolymer containing 50 wt% PVP and 50 wt% VAc and was found not to be redispersible by evaluation of a dried film.

COMPARATIVE EXAMPLE 3

The emulsion of Example 1 was blended with 10 wt% poly(VP/VAc) containing 75 wt% PVP and 25 wt% VAc it was found not to be redispersible by evaluation of a dried film.

COMPARATIVE EXAMPLE 4

The polymer emulsion of Example 2 was blended with 8 wt% PVOH and was found not to be redispersible by evaluation of a dried film.

COMPARATIVE EXAMPLE 5

The polymer emulsion of Example 3 was blended with 15 wt% PVOH and was found not to be redispersible by evaluation of a dried film.

COMPARATIVE EXAMPLE 6

The polymer emulsion of Example 4 was blended with 12 wt% PVOH and was found not to be redispersible by evaluation of a dried film.

STATEMENT OF INDUSTRIAL APPLICATION

The present invention provides a method for spray drying polymeric emulsions that are stabilized with a non PVOH-containing stabilizing system.

I claim:

1. In a method for preparing a polymer powder which is redispersible in water by atomizing an aqueous polymer dispersion containing a dispersing aid, the improvement which comprises employing an aqueous polymer dispersion consisting of a non-polyvinyl alcohol stabilized polymer dispersion and an effective amount of a dispersing aid consisting of vinyl pyrrolidone homopolymer.

2. The method of claim 1 in which the vinyl pyrrolidone homopolymer has a K value ranging from 12 to 120.

3. The method of claim 1 in which the vinyl pyrrolidone homopolymer has a K value ranging from 15 to 90.

4. The method of claim 1 in which the vinyl pyrrolidone homopolymer has a K value of about 30.

5. The method of claim 1 in which the polymer of the aqueous polymer dispersion is an ethylene-vinyl chloride copolymer.

6. The method of claim 1 in which the polymer of the aqueous polymer dispersion is an acrylate copolymer.

7. The method of claim 1 in which the polymer of the aqueous polymer dispersion is a vinyl acetate/ethylene/acrylate copolymer.

8. The method of claim 1 in which the polymer of the aqueous polymer dispersion is a vinyl acetate/ethylene/acrylic acid copolymer.

9. In a method for preparing a polymer powder which is redispersible in water by atomizing an aqueous polymer dispersion containing a dispersing aid, the improvement which comprises employing an aqueous polymer dispersion consisting of a non-polyvinyl alcohol stabilized polymer dispersion and a dispersing aid consisting of vinyl pyrrolidone homopolymer having a K value ranging from 15 to 90, the dispersing aid at 3 to 20 wt% based on the polymer content of the aqueous polymer dispersion.

10. The method of claim 9 in which the polymer of the aqueous polymer dispersion is an ethylene/vinyl chloride copolymer, an acrylate copolymer, a vinyl acetate/ethylene/acrylate copolymer or a vinyl acetate/ethylene/acrylic acid copolymer.

11. The method of claim 10 in which the vinyl pyrrolidone homopolymer has a K value of about 30 and the dispersing aid is at 5 to 18 wt%.

* * * * *